United States Patent [19]

Latka

[11] Patent Number: 4,841,158
[45] Date of Patent: Jun. 20, 1989

[54] SAFETY RELAY CIRCUIT FOR SWITCHING ON ELECTRIC SYSTEMS OF AUTOMOTIVE VEHICLES

[75] Inventor: Franz Latka, Niddatal, Fed. Rep. of Germany

[73] Assignee: Alfred Teves GmbH, Frankfurt am Main, Fed. Rep. of Germany

[21] Appl. No.: 165,328

[22] Filed: Mar. 8, 1988

[30] Foreign Application Priority Data

Mar. 19, 1987 [DE] Fed. Rep. of Germany ....... 3709059

[51] Int. Cl.$^4$ .............................................. B60T 17/18
[52] U.S. Cl. ..................................... 307/10.1; 303/11; 303/65; 340/452
[58] Field of Search ................. 307/9, 10 R; 188/296; 340/52 R, 52 B, 52 C; 303/3, 7, 9, 10, 11, 12, 13, 14, 15, 16, 17, 18, 19, 20, 28, 29, 63, 64, 65, 78, 92, 100, 111, 112, 113, 114, 115, 116, 117, 118, 119; 364/184, 426, 185, 186; 361/166, 167, 168.1, 169.1, 170, 189, 190, 191, 192, 193, 247–250

[56] References Cited

U.S. PATENT DOCUMENTS 4,699,435 10/1987 Wupper ................................. 303/11

Primary Examiner—William M. Shoop, Jr.
Assistant Examiner—Paul Ip
Attorney, Agent, or Firm—James B. Raden

[57] ABSTRACT

A safety relay circuit for operating electric systems of automotive vehicles is disclosed. The circuit includes two series-connected change-over relays connecting the vehicle's electrical system to the operative voltage. The change-over relays are actuated by switches acted upon by a control circuit. The control circuit assures that the change-over relays are actuated alternatively.

15 Claims, 1 Drawing Sheet

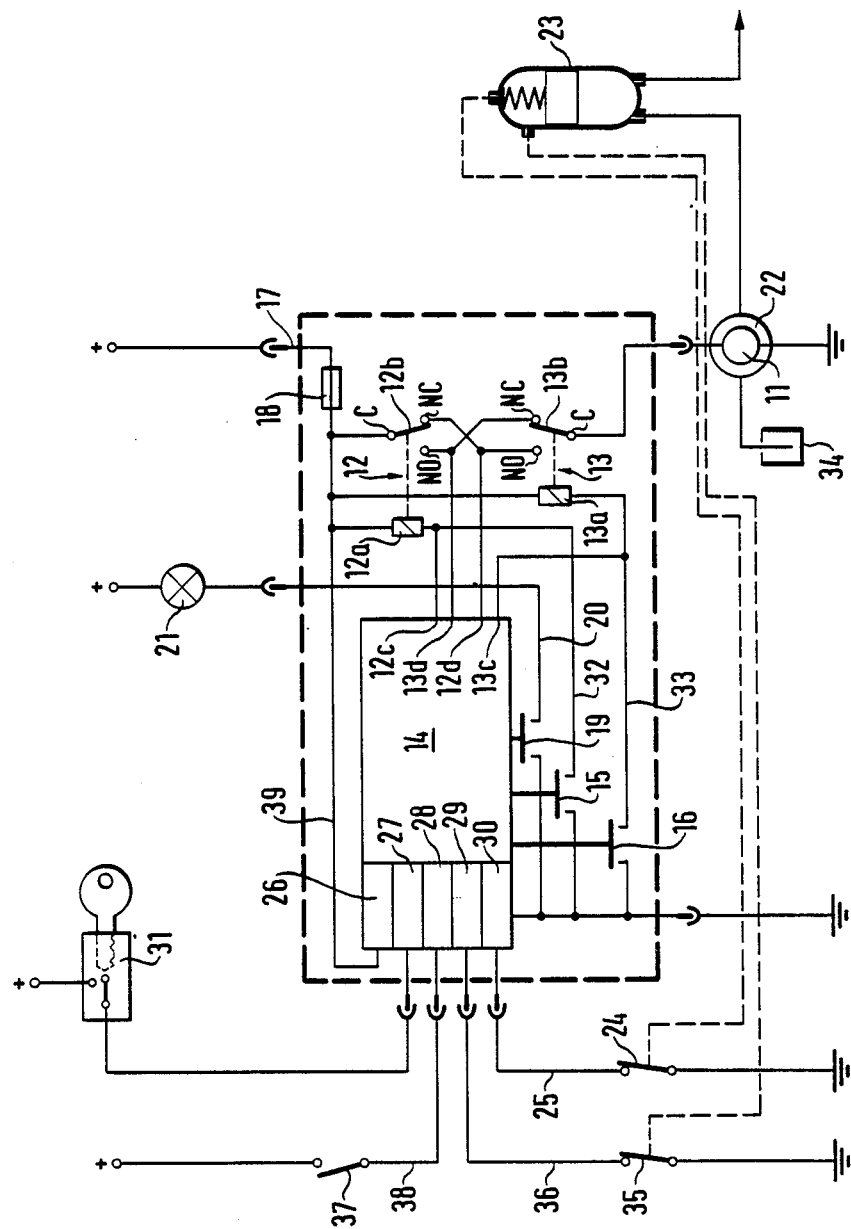

SAFETY RELAY CIRCUIT FOR SWITCHING ON ELECTRIC SYSTEMS OF AUTOMOTIVE VEHICLES

BACKGROUND OF THE INVENTION

This invention relates to a safety relay circuit for switching on electric systems such as a pump motor, of an automotive vehicle which, upon start of the vehicle, in particular through turning on of the ignition, must at least temporarily start up so that the vehicle is put into an operationally safe condition ready for driving.

When using relays in brake systems of automotive vehicles it must be taken into consideration that high requirements with regard to safety are to be imposed on such relays and their circuits. Most relays are not sufficiently safe for brake systems in automotive vehicles.

SUMMARY OF THE INVENTION

It is therefore an object of this invention to provide a safety relay circuit for switching on automotive vehicles' electric systems, and in particular the pump motor of a hydraulic brake system of automotive vehicles, which includes redundancy, which monitors and reports the failure of certain components and contacts of the system and which, in the situation where the redundancy becomes operational due to an emergency situation, signals the defect to the driver by means of a warning signal.

This object is achieved according to the invention by providing for the vehicle's system to be protected by connecting it to the operating voltage by way of two series-connected change-over relays actuated by switches acted upon by a control circuit. Further, according to the invention, with the ignition switched off, the control circuit brings the contact arms of the change-over relays into a state-of-rest-defining position so as to ensure that the closed contact of one change-over relay, and that alternatively only one change-over relay or the other changes over in case of consecutive switching-on operations of the ignition or in case of turn-on processes initiated by other switch devices.

According to the invention, two change-over relays are connected in series in such a manner as to ensure that in each case only one of the two change-over relays will have to be actuated for the purpose of actuating the particular system. Due to the alternative actuation feature, both relays are permanently actuated. Thus, advantageously, the relays do not form a master relay-auxiliary relay relationship, but rather, both relays are in continuous use. Accordingly, a continuous monitoring of each one of relays is in continuous use. Accordingly, a continuous monitoring of each one of the two relays is possible. Further, the danger of relay failure due to corrosion or fatigue due to prolonged non-use is avoided.

The inventive control circuit can have a particularly compact and effective design through the use of a microprocessor.

The operational safety of the circuit is monitored by the provision of several test inputs at the control circuit. According to a preferred embodiment, it is provided that the inputs of the change-over relays, which are actuated through the switches, are coupled to a first and a second test input of the control circuit and the control circuit monitors the actuations of the change-over relays in dependence on the input control signals.

Further, preferably the contact of the change-over relay which is coupled to the battery voltage, which contact is closed when the ignition is switched off, is connected with a third test input of the control circuit and the control circuit accordingly monitors the operation of the respective contact, the battery voltage and, if applicable, the condition of a fuse connected into the battery voltage line.

Finally, it is advantageous that the contact of the change-over relay which is coupled to the vehicle's particular electrical system, which contact is closed when the ignition is switched off, be connected with a fourth test input of the control circuit and that the control circuit monitors the current-carrying parts of the automotive vehicle's electrical system, the connecting lines leading thereto, and the respective contact of the change-over relay.

While the afore-described tests are statically performed, the invention according to another preferred embodiment provides for a dynamic test wherein, by means of the signals at the third and fourth test inputs, the control circuit also monitors the operation of the particular relay just actuated upon turn-on of the ignition cancels the actuation of the failing change-over relay and immediately actuates the respective other change-over relay when a signal change fails to appear at the associated test input. Upon failure of either relay, the other relay thus automatically, and without delay, switches on the vehicle's electrical system which may be of decisive importance for the operation of the vehicle.

It is advantageous that an alarm switch be connected to the control circuit with the alarm switch becoming closed by the control circuit when there appears a relay defect signal at the third or fourth test input. The alarm switch accordingly completes the electric circuit of a warning light. The driver is thus made aware of the failure of either change-over relay which are provided redundantly so that he will have the defect corrected as soon as possible. The circuitry, is such that it ensures that the warning light remains lighted even in case of further turning-on-and-off sequences of the ignition so as to prevent the driver from gaining the false impression that everything is operating properly.

A preferred application for this invention is with the motor of a hydraulic pump for charging a hydropneumatic accumulator of the brake system of an automotive vehicle.

In such an application there is provided a first pressure switch which is acted upon by the pressure of the accumulator and which is connected in a further input control line of the control circuit and which, in its off-position, that is when the accumulator is charged, prevents change-over of the change-over relay from a state of rest into a closed state and even when the ignition is switched on. The pressure switch has a hysteresis resulting in the effect that it will not reach its on-position again before the pressure in the accumulator has dropped below a lower operating limit pressure lying substantially below the maximum pressure. In other words, the pressure switch will prevent an actuation of the pump motor if there is a pressure available in the pressure accumulator sufficient for proper operational safety.

Another feature of the invention ensures at least an emergency function should the first pressure switch fail and not switch on the motor of the pump as it should when there is a pressure drop below the lower operating limit pressure. A second pressure switch which is acted upon by the pressure of the accmulator is connected in a further input control line of the control circuit and responds to a pressure in the accumulator below the operating limit pressure and at which pressure the switch turns on the motor of the pump if the motor is not yet running due to a failure of the first pressure switch and simultaneously causes the warning switch to close and thus the warning light to turn on.

Additional emergency function can be ensured according to the invention wherein the stoplight switch is connected to a further input control line of the control circuit. The stoplight switch causes the motor of the pump and the warning light to be switched on upon brake application if the first pressure switch is in its on-position, with the motor of the pump not running.

Finally, the invention provides for a circuit which itself will recognize any leak in the pressure circuit. To this end, the invention provides for the control circuit to measure the charge times for charging the accumulator as of the time of response of the first pressure switch and, in case of charge times exceeding a predetermined maximum nominal charge time, causes the alarm switch to be actuated.

Further, it is preferable that the control circuit be provided with attenuation filters for each input. Each switch tends to vibrate slightly when closing and opening so that a slight attenuation is desired to prevent the contacts from becoming welded together. In particular, the attenuation filters have a time constant equal to or greater than 50 msecs. Uncontrolled switching of the relays, (for example arcing of the relays,) is thus effectively avoided.

BRIEF DESCRIPTION OF THE DRAWING

The invention will be better understood from the following Detailed Description of the Preferred Embodiment with reference to the drawing the sole FIGURE of which is a block diagram of a safety circuit for the brake system of an automotive vehicle according to the invention.

DETAILED DESCRIPTION OF A PREFERRED EMBODIMENT

As shown in the drawing, by actuating the ignition switch 31 of an automotive vehicle, it is possible to apply a positive voltage to an attenuation filter 27 arranged in a control circuit 14. The control circuit 14 will either actuate one or the other of two switches 15 or 16 which are connected to the control circuit. The control circuit 14 is a microprocessor programmed so that in case of consecutive turn-on operations of the ignition switch 31 alternatively one switch 15 or the other 16 is closed. In the drawing, both switches 15, 16 are shown in their open position which is also the rest position which is represented in the drawing and which is assumed by the individual components when the ignition switch 31 is open.

The switches 15, 16 are each connected into relay control lines 32 and 33, respectively, wherein there are also arranged the electromagnetic coils 12a and 13a of respectively the relays 12 and 13. Further, the switches 15, 16 are grounded while the poles of the electromagnetic coils 12a, 13a, which are connected to the switches 15, 16, are applied to the battery voltage line 17 by way of a fuse 18.

Further, the relays 12, 13 each have a contact arm 12b and 13b, respectively. The contact arms 12b and 13b in each case make contact with one of two switch contacts NO or NC, respectively. In the rest position, the contact arms 12b, 13b are in electrically conducting contact with the switch contacts NC.

The contacts NC of the two relays 12, 13 are connected in an electrically conducting manner with the switch contact NO of the respective other relay 13, 12.

The contact arm's contact C of relay 12 is coupled to the battery voltage line 17 by way of the fuse 18 while the contact arm's contact C of relay 13 is connected with one of the poles of the electric motor 11 of a pump 22 which supplies a hydropneumatic accumulator 23 with hydraulic pressure medium out of a reservoir 34. Connected to the hydropneumatic accumulator 23 is the hydraulic brake system of the automotive vehicle. The specific hydraulic connections of the system are not illustrated.

A test input 12c of the microprocessor 14 is connected to line 32. A further test input 13c of the microprocessor 14 is connected to line 33.

Finally, the switch contacts NO of the two changeover relays 12, 13 are connected in an electrically conducting way with further test inputs 12d and 13d, respectively.

The microprocessor 14 further acts on an alarm switch 19 which, by way of a line 20, permits the grounding of a warning light 21 connected to a positive voltage.

In an input line 25 of the microprocessor 14, there is a first pressure switch 24 acted upon by the hydraulic accumulator 23. The pressure switch 24, for example, will open when the maximum operating pressure has been reached. It will close, when the pressure drops below the lower limit of the operating pressure range.

The line 25 is connected to the input of the microprocessor 14 through an attenuation filter 30.

A second pressure switch 35 is connected in parallel with the first pressure switch 24 to a further input of the microprocessor 14 by way of line 36, and another attenuation filter 29. As indicated by a broken line, the second pressure switch 35 is also acted upon by the pressure in the accumulator 23. However, the switch 35 will not respond before the pressure has dropped below the lower operating limit pressure. This can only occur if the first pressure switch 24 has failed in which case the second pressure switch 35 will take over the duty of the first. At the same time, the second switch 35 will switch on the warning light 21 by way of the alarm switch 19 so that the driver is made aware of a failure.

Finally, by way of an input line 38, the stoplight switch 37 is also connected to the microprocessor 14. The connection is effected through a further attentuation filter 28. The stoplight switch 37 is therefore available to take over in emergency situation and turn on the motor 11 should the pressure switches fail.

The microprocessor 14 further monitors the time intervals which elapse to fully charge the accumulator 23 after a response of the first pressure switch 24. If the intervals exceed a predetermined charge time with the brake not applied, that is, with the stoplight switch 37 open, the alarm switch 19 will close and the warning light 21 will light up. In such a case this is an indication that there is a leak in the hydraulic pressure lines.

Power is supplied to the microprocessor 14 by way of a line 39 which branches off from the fuse 18 and is connected to a further input of the microprocessor 14 through an attenuation filter 26.

The mode of operation of the described relay control circuit is as follows:

With the ignition switch 31 switched on, the microprocessor 14 will close either switch 15 or switch 16. Consequently, the associated relay 12 or 13 will be changed over. In both cases the motor 11 of the pump 22 will be connected to the battery voltage and thus put into operation. The pump can charge the hydraulic accumulator 23. When the charging operation is terminated, the switch 24 will open and the change-over relay which had been closed at first will now be opened again. In other words, the contact arm 12b or 13b which was contacting the switch contact NO is returned to the rest position toward the switch contact NC. Upon subsequent operation of the ignition switch 31, or of the pressure switch 24, that relay will be actuated which had been inactive during the preceding operation.

The action on the electromagnetic relay coils 12a, 13a is monitored at the test inputs 12c and 13c, respectively. Should either of the switches 15, 16 not close, this would be recognized by the microprocessor 14 and it then would be possible to excite the other one of the two relays by way of its associated switch.

Should either of the contact arms 12b or 13b become stuck, this would also be noted by the microprocessor 14 at the test inputs 12d and 13d, respectively. In that case, the microprocessor can also immediately actuate the other relay 12b or 13b. At the same time, in case of failure of either switch 15 or 16 or of the relays 12 or 13, the microprocessor will close the alarm switch 19, thus activating the warning light 21 and signalling the defect to the driver.

The alarm switch 19 will also close whenever an irregularity in the pressure switches 24, 35 occurs or when the microprocessor 14 notes an excessive charge time of the accumulator 23.

Thus the system apprises the driver of an irregularity in the circuit any time the warning light 21 lights.

What is claimed is:

1. A safety relay circuit for the ignition switch controlled electrical system of an automotive vehicle, said safety circuit comprising a pair of change-over relays, each having a contact arm shiftable between a normal open contact and a normal closed contact and being engaged with the normal closed contact when the relay is in its normal deenergized state, the open contact of each relay being connected to the closed contact of the other, one of said closed contacts being connected to an electrical power source and the other of said closed contacts being connected to said electrical system, control circuit means connected to said ignition switch and to a pair of normally open relay control switches respectively connected to said relays to energize the relay when the relay switch connected thereto is closed, said control circuit including means for maintaining both of said control switches in their respective normal open positions when said ignition switch is off and for closing one of said control switches only upon a first actuation of said ignition switch and for closing the other of said control switches only upon the next subsequent actuation of said ignition switch, and auxiliary switch actuating means connected to said control circuit for energizing or deenergizing said relays independently of said control switches.

2. The circuit as claimed in claim 1 wherein the control circuit is a microprocessor.

3. The circuit as claimed in claim 2 further comprising test input means for supplying a first and a second test input to said control circuit means and means in said control circuit means for monitoring actuation of the change-over relays in response to the inputs supplied by said test input means.

4. The circuit as claimed in claim 3 wherein one contact of one change-over relay is connected to a battery voltage when the ignition switch is switched off, and is also connected to a third test input of the control circuit means, the control circuit means including means for monitoring the operation of said one contact, and the battery voltage.

5. The circuit as claimed in claim 4 wherein a contact of the second change-over relay is connected to the vehicle's electrical system to be controlled, the last-mentioned contact being closed when the ignition switch is switched off, and being also connected to a fourth test input of the control circuit means, the control circuit means including means for monitoring current-carrying parts of the vehicle's electrical system and the contact of the second change-over relay.

6. The circuit as claimed in claim 5 wherein said control circuit means further comprises means operable in response to signals at the third and fourth test inputs for monitoring the operation of that change-over relay which is to be actuated upon the ignition switch being turned on and deactivates the last-mentioned change-over relay upon sensing a failure of said relay to change over as recognized by no signal change at said fourth test input upon switching on the ignition switch, whereupon said control circuit actuates the respective other change-over relay.

7. The circuit as claimed in claim 6 further comprising an alarm switch connected to the control circuit means, said control circuit means including means for closing said alarm switch when there appears a relay defect signal at either of the third and fourth test input, said alarm switch being connected in an electrical circuit of a warning light.

8. The circuit as claimed in claim 7 wherein said electrical system includes an electric motor mechanically connected to a hydraulic pump for charging a hydropneumatic accumulator of a brake system of the automotive vehicle and electrically connected to said change-over relays.

9. The circuit as claimed in claim 8 further comprising a first pressure switch responsive to the pressure of the accumulator, said first pressure switch being electrically connected to the control circuit means being operable to assume an off-position when the accumulator is charged, whereby said control circuit means prevents change-over of the change-over relay when the ignition is turned on, said first pressure switch includes a hysteresis effect such that said first pressure switch will not reach an on-position before the pressure in the accumulator has dropped below a lower operating limit pressure lying clearly below a maximum pressure.

10. The circuit as claimed in claim 9 further comprising a second pressure switch responsive to the pressure of said accumulator, said second pressure switch being electrically connected to the control circuit means and being operable to close at a pressure lying below the lower operating limit pressure whereby said control circuit means activates said change-over relays to turn on the motor of the pump and said control circuit means simultaneously activates the alarm switch to close and completes the circuit to said warning light.

11. The circuit as claimed in claim 10 further including a stoplight switch connected to the control circuit means, said stoplight switch closing up on brake application, and said control circuit means in response to said closing of said stoplight switch causes the motor of the pump and the warning light to be switched on if the first pressure switch is in its on-position, with the motor of the pump not running.

12. The circuit as claimed in claim 11 further including attenuation filters for each input to said control circuit means.

13. The circuit as claimed in claim 12 further including attenuation filters at the test inputs to said control circuit means.

14. The circuit as claimed in claim 13 wherein the attenuation filters have a time constant equal to or greater than 50 msecs.

15. The circuit as claimed in claim 11 wherein the control circuit means includes means for measuring charge times for charging the accumulator as of the response of the first pressure switch and, when the charge time exceeds a predetermined maximum nominal charge time, said last-mentioned means activates the alarm switch to close if the stoplight switch is open.

* * * * *